United States Patent [19]

Schlienger

[11] Patent Number: 4,770,109

[45] Date of Patent: Sep. 13, 1988

[54] APPARATUS AND METHOD FOR HIGH TEMPERATURE DISPOSAL OF HAZARDOUS WASTE MATERIALS

[75] Inventor: Max P. Schlienger, Ukiah, Calif.

[73] Assignee: Retech, Inc., Ukiah, Calif.

[21] Appl. No.: 46,483

[22] Filed: May 4, 1987

[51] Int. Cl.[4] .............................................. F23G 7/04
[52] U.S. Cl. .................................... 110/247; 110/346; 110/250; 110/348
[58] Field of Search ............... 110/346, 235, 348, 259, 110/250, 247

[56] References Cited

U.S. PATENT DOCUMENTS

| | | | |
|---|---|---|---|
| 1,724,352 | 8/1929 | Ilving | 110/247 |
| 2,402,436 | 6/1946 | Nichols | 110/247 |
| 2,505,363 | 4/1950 | Nichols | 110/247 |
| 3,599,581 | 8/1971 | Schoppe | |
| 3,680,503 | 8/1972 | Danielsson et al. | 110/247 |
| 3,779,182 | 12/1973 | Camacho | |
| 3,918,374 | 11/1975 | Yamamoto et al. | 110/250 |
| 4,137,051 | 1/1979 | Godwin | 110/247 |
| 4,181,504 | 1/1980 | Camacho | 48/197 |
| 4,388,876 | 6/1983 | Burton | 110/247 |
| 4,417,529 | 11/1983 | Fujimoto et al. | 110/346 |
| 4,437,452 | 3/1984 | Reschty | 110/247 |
| 4,545,306 | 10/1985 | Wolfram | 110/247 |
| 4,582,004 | 4/1986 | Fey et al. | 110/346 |
| 4,615,285 | 10/1986 | Bentell et al. | 110/346 |

FOREIGN PATENT DOCUMENTS 1170548 11/1969 United Kingdom .

OTHER PUBLICATIONS

"Plasma Technology in Metallurgical Processing", pp. 179–184.

Primary Examiner—Henry C. Yuen
Attorney, Agent, or Firm—Townsend and Townsend

[57] ABSTRACT

An improved plasma torch incinerator or reactor in which the incinerator uses a rotating, materials-receiving drum or chamber for receiving the hot plasma of a plasma torch. By properly constructing the inner surface of the rotatable drum and by varying the speed of rotation of the drum, waste materials can be effectively spread out over the inner surface of the drum to form a relatively thin layer of waste materials which has a large surface area which can be more quickly heated to the desired high temperatures provided by the plasma torch. Moreover, the spreading out of the waste materials can cause them to be recirculated and mixed by periodically reducing the speed of rotation of the drum. The plasma of the plasma torch is not directed toward a stationary part of the drum. Instead, the plasma torch is directed at a rotatable portion of the drum which provides for a better heat distribution and permits portions of the drum to cool during the intervals when they are not in direct contact with the plasma. Thus, liquid as well as solid waste materials can be fed together into the rotating drum.

20 Claims, 6 Drawing Sheets

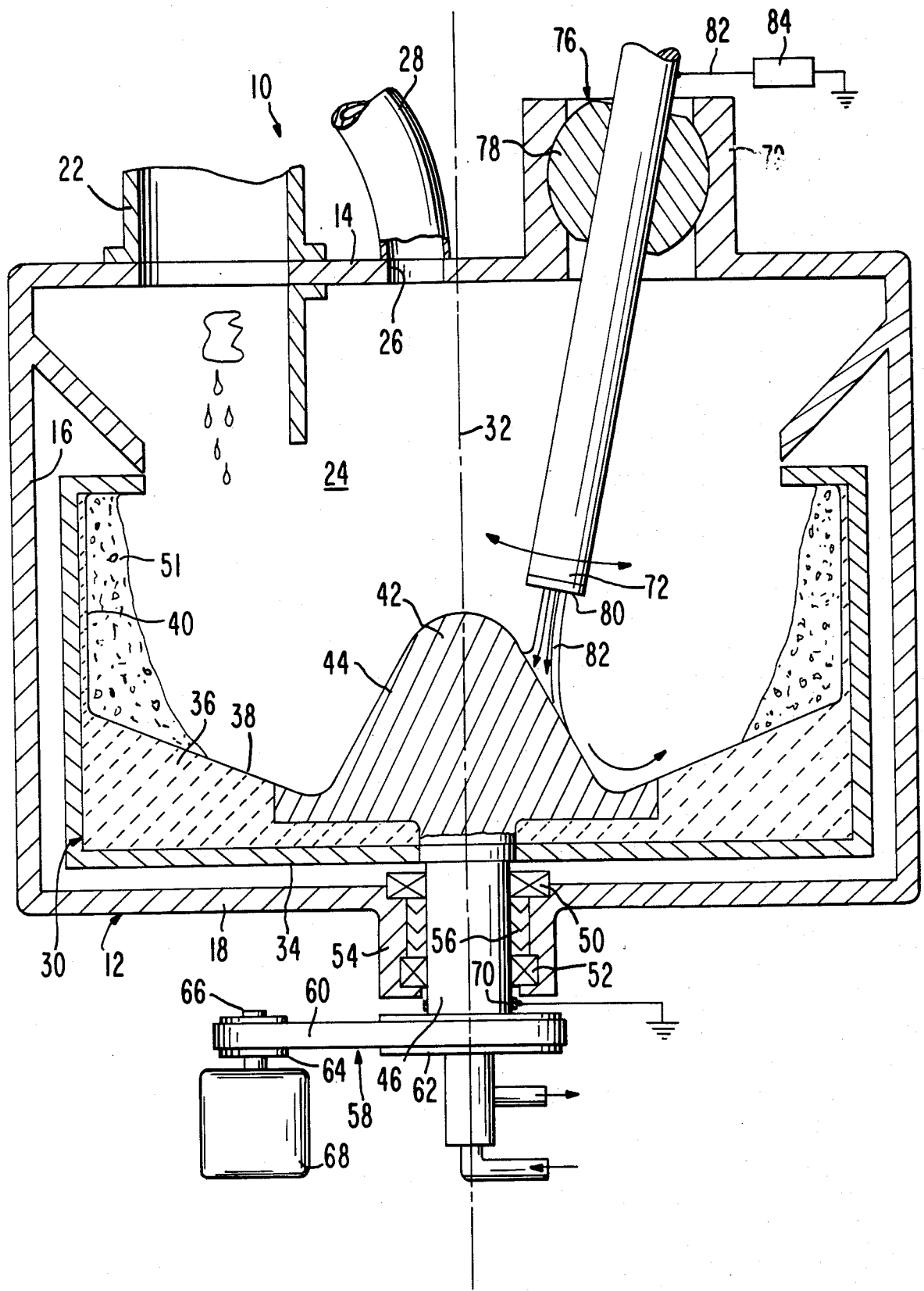

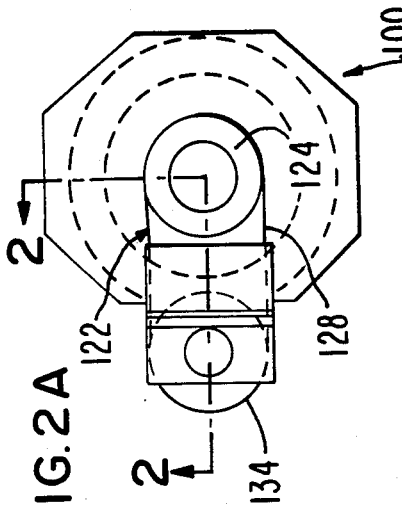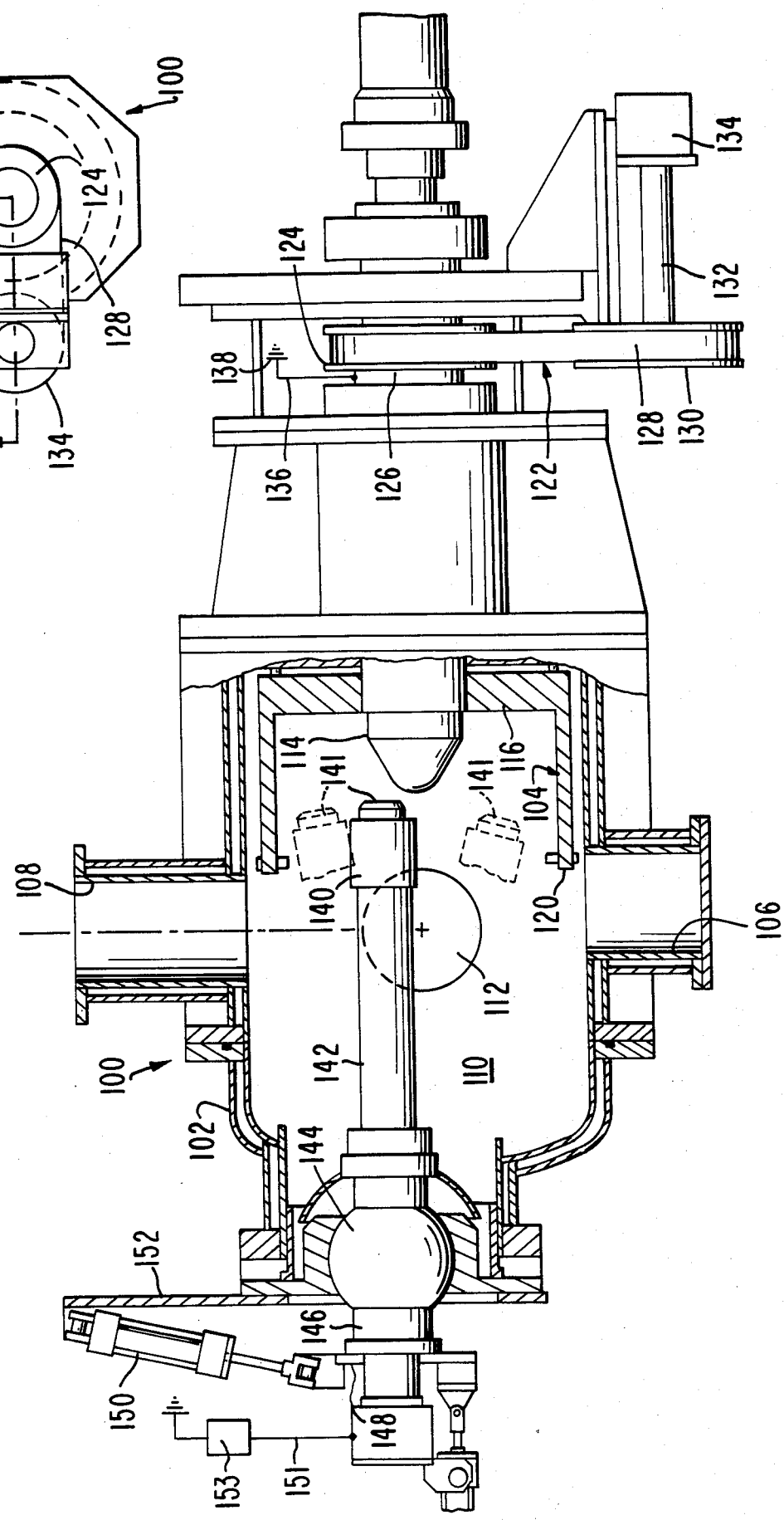

APPARATUS AND METHOD FOR HIGH TEMPERATURE DISPOSAL OF HAZARDOUS WASTE MATERIALS

This invention relates to improvements in the treating of waste materials, especially of hazardous waste materials containing combustables and critical, high performance alloys and, more particularly, to apparatus and a method for disposing of hazardous waste materials by incineration, pyrolysis, and melting.

BACKGROUND OF THE INVENTION

The disposal of waste materials, especially toxic wastes, with plasma torches is well known and has been performed in the past. In such a process, a plasma torch transfers electrical energy through a stream of ionized gases so that the gases become an electrical conductor. With such a torch, very high temperatures in the area of 10,000°–15,000° Centigrade can be attained.

In general, there are two types of plasma torches, one a non-transferred arc torch and the other a transferred arc torch. In the non-transferred arc torch, the electrical potential is entirely contained within the torch, i.e., between two axially spaced rings. In such a torch, hot gases are emitted from one end of the torch.

A transferred arc torch, on the other hand, can be used in which the torch tube or body is one side of an electrical field and the other side of the field is exteriorly of the torch and spaced from the torch. The transferred arc torch is the more efficient one and enables the attainment of higher operating temperatures.

A plasma torch disposal reactor raises the temperature of waste materials, including toxic waste materials, through such high levels that such materials chemically break down (pyrolysis). This breakdown can be enhanced by maintaining an atmosphere of the appropriate gas in the incinerator. As a result, the residues are usually harmless gases and solids which are suitably removed from the incinerator.

While conventional plasma torch incinerators are satisfactory in certain applications, they have their drawbacks inasmuch as the waste materials treated thereby are sometimes not presented efficiently to the plasma torch thereof so as to provide for complete incineration, pyrolysis, or melting of the waste materials. Because of such drawbacks, a need exists for improvements in plasma torch reactors and the present invention satisfies this need.

Patents relating to the field of materials incineration include U.S. Pat. Nos. 3,599,581, 3,779,182, 4,181,504, 4,582,004 and 4,615,285 and British Pat. No. 1,170,548.

SUMMARY OF THE INVENTION

The present invention provides an improved plasma torch incinerator or reactor in which the incinerator uses a rotating, materials-receiving drum or chamber for receiving the hot plasma of a plasma torch. By appropriately constructing the inner surface profile of the rotatable drum and by varying the speed of rotation of the drum, waste materials directed into the incinerator can be effectively spread out over the inner surface of the drum. This spreading out effect forms a relatively thin layer of waste materials which has a large surface area which can be more quickly heated to the desired high temperatures provided by the plasma torch. Moreover, the spreading out of the waste materials can cause them to be recirculated and mixed by periodically reducing the speed of rotation of the drum to permit materials to flow and thereby be spread out by gravity from the side and bottom walls of the drum.

Another advantage of the present invention is the fact that the plasma of the plasma torch is not directed toward a stationary part of the drum itself. This would tend to overheat the drum and to limit the temperature with which the plasma torch may be operated. Instead, the plasma torch is directed at a rotatable portion of the drum which provides for a better heat distribution and permits portions of the drum to cool during the intervals when they are not in direct contact with the plasma plume of the plasma torch. Thus, it is no longer necessary to feed the materials into the incinerator in liquid form as is true with certain conventional waste incinerators. Thus, with the improvements of the present invention, liquid as well as solid waste materials can be fed directly into the rotating drum so as to greatly simplify the handling of such wastes.

The primary object of the present invention is to provide apparatus and a method for handling waste materials, especially hazardous waste materials containing both combustibles non-combustibles, and metals, wherein the apparatus includes a rotary drum in a closed vessel adapted for receiving the waste materials and the speed of the drum can be controlled to cause a change in the distribution of the waste materials on the inner surface portions of the drum so as to present the waste materials more efficiently to the plasma plume of a plasma torch while assuring that the temperatures of the plasma torch remain sufficiently high to achieve such efficient incineration pyrolysis or melting of the waste materials.

Another object of the present invention is to provide apparatus and method of the type described wherein a transferred arc type of plasma torch can be used to achieve a relatively high operating temperatures yet the materials-receiving drum itself can provide a rotatable portion subjected to the plasma of the plasma torch so that the drum has no stationary part in contact with the plasma and the drum can thereby cool periodically as it rotates.

Other objects of this invention will become apparent as the following specification progresses, reference being had to the accompanying drawings for an illustration of the invention.

IN THE DRAWINGS

FIG. 1 is a vertical section, partly schematic of a first embodiment of the plasma reactor of the present invention;

FIG. 2 is a side elevation of view, partly in section, of a second embodiment of the reactor of the present invention, parts being broken away and in section to illustrate details of construction;

FIG. 2A is a bottom plan view of the reactor of FIG. 2;

Figure 3A:
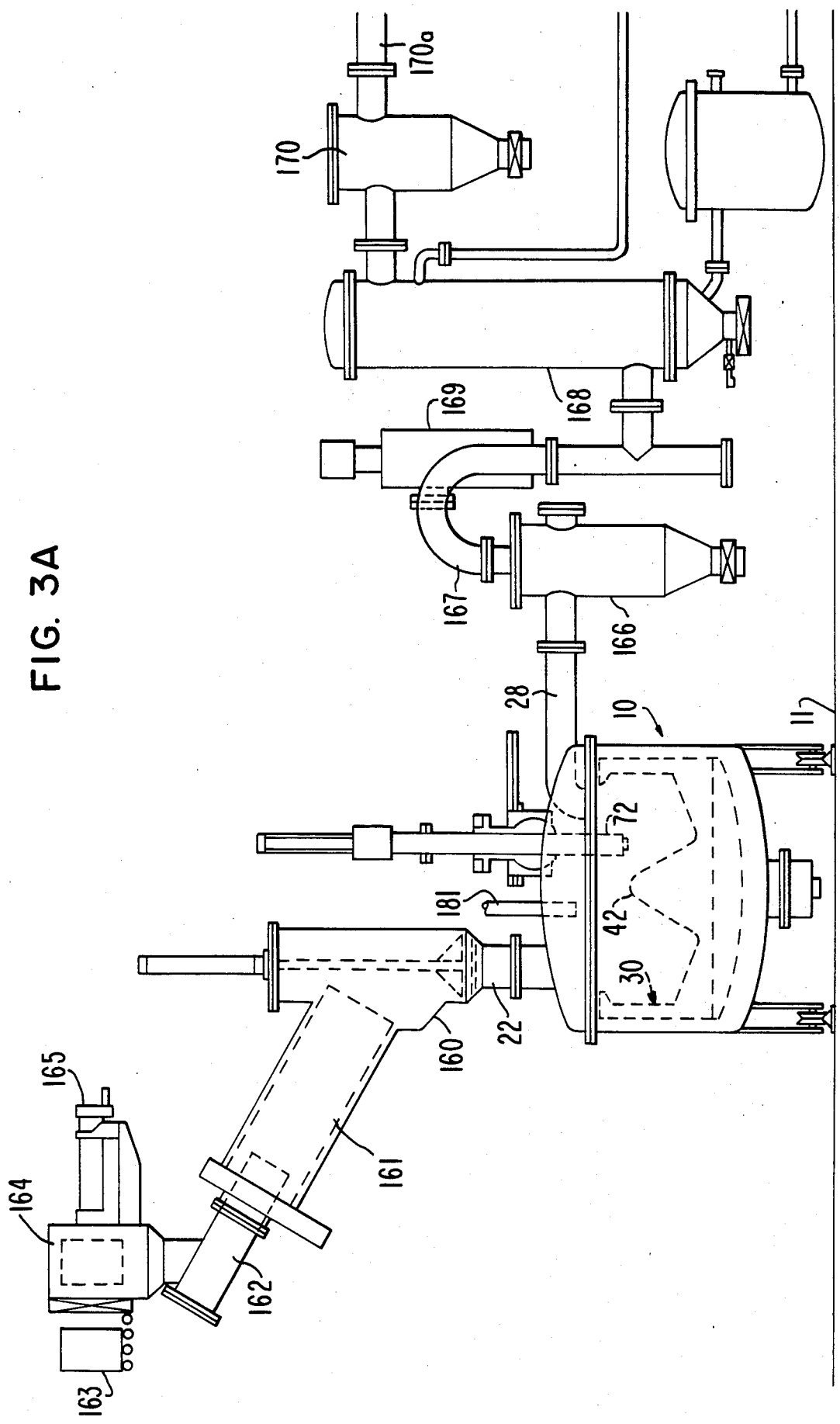
FIG. 3A is a side elevational view of a system for treating hazardous waste materials using the reactor of the present invention.

A first embodiment of the plasma reactor of the present invention is broadly denoted by the numeral 10 and is shown in FIG. 1. Reactor 10 includes a hollow, closed containment vessel 12 having a top wall 14, a cylindrical side wall 16 and a bottom wall 18. Top wall 14 has a first opening 20 coupled with a pipe 22 for feeding waste materials into the interior space 24 of vessel 12. Top wall 14 also has a second opening 26 coupled with a pipe 28 for directing products of combustion or an effluent out of space 24.

A rotary drum 30 is mounted within vessel 12 for rotation about a generally vertical axis 32 which is the central axis of side wall 16 of vessel 12. Drum 30 has an open top and a bottom 34 on which a layer 36 of refractory material is placed. Layer 36 is annular in shape and presents a first, inclined surface 38 and a second, vertical surface 40 extending upwardly from the outer periphery of surface 38. A conical, electrical conducting, member 42 is rigid to bottom 34 and has a conical outer surface 44. Member 42 projects upwardly from bottom 34 and has a spindle 46 rigid thereto and extending downwardly therefrom through an opening 48 in the bottom 34 of the drum.

Spindle 46 is mounted by vertically spaced bearings 50 and 52 carried by a sleeve 54 at the bottom wall 18 of vessel 12. A rotary seal 56 surrounds spindle 46 and seals the interior space 24 from the atmosphere. A belt and pulley assembly 58 is coupled to the lower part of spindle 46 and includes a belt 60 mounted on a pulley 62 rigid to the lower end of spindle 46. The belt is also coupled to a second pulley 64 on a drive shaft 66 of a variable speed drive motor 68 carried in any suitable location on a fixed support beneath vessel 12.

An electrical conductor 69 is coupled to a slip ring 70 in electrical contact with spindle 46. The conductor 69 is coupled to an electrical ground 71 so that spindle 46 and thereby member 42 will be at electrical ground potential.

A plasma torch 72 has a torch body 74, is pivotally mounted by pivot means 76 on top wall 14 of vessel 12. Pivot means 76 comprises a ball 78 contained in a socket 79 carried by top wall 14. The ball and socket joint 76 has seal means (not shown) coupled therewith so that there is no communication of space 24 with the atmosphere surrounding vessel 12.

Torch 74 has a lower, open end 80 from which a plasma plume 82 flows after an arc has been initiated between torch body 72 and member 42. To this end, a suitable electrical conductor 82 is coupled electrically in some suitable manner to torch electrode 72 and is also coupled to the high voltage terminal of an appropriate power source 84. Source 84 has one terminal electrically coupled to ground; thus, the potential difference between member 42 and torch 72 is sufficient to establish an electrical field therebetween which will sustain the plasma plume 82 across gap between member 42 and the inner end of torch 72. Thus, torch 72 is of the transferred arc type which is more efficient than a non-transferred arc torch. The latter type has an electrical field entirely contained within a torch body, such as between two axially spaced rings in a torch body.

In operation, drive motor 68 is energized to cause rotation of drum 30 about central axis 32. Thus, when an arc is struck between member 42 and torch 72, a plasma plume 82 is created for incinerating, melting, pyrolysis and reacting with waste materials entering the drum 30 through pipe 22. Waste materials directed into vessel 12 gravitate into drum 30 and onto the bottom of the drum.

The plasma torch is capable of producing temperatures in the range of 10,000° to 15,000° Centigrade. Drum 30 can be of any size consistent with the type of waste materials to be incinerated and with respect to the throughput requirements of reactor 10.

The rotational speed of drive motor 68 is such as to cause centrifugal forces from 0 to 20 g's or greater at the outer periphery of drum 30. The waste materials include combustibles, non-combustibles, liquids and metals.

As the drum rotates, the waste materials move by centrifugal force radially outwardly of the central axis 32 of drum 30. A mass 51 of waste materials is shown in FIG. 1 against the inner surface of vertical side wall 40 of the drum, the waste materials assuming this position due to the rotation of the drum about central axis 32. By regulating the speed of rotation of the drum, liquids or solids will slide downwardly and into the region of high heat where incineration, pyrolysis reactions or melting of the waste materials can take place. For different applications, different arrangements of geometry could be used; however, the primary design purpose of reactor 10 is to enable a mixed feed of waste materials to be subject to the high heat energy generated by the plasma torch 72.

As metal is melted, it can be removed from the reactor 10 as a ring. Scraper arms could be provided to break centrifuged material from the inner surface of side wall to of the drum 30 as required. With the variable g application, control of combustion, reaction or melting would be enabled in conjunction with controlling the atmosphere in the drum by the plasma gases or direct gas additions to the containment vessel 12.

Reactor 10 can handle a wide variety of feed stock, such as solvents, PCB, metals, wood, plastic, hydrocarbons and the like. It can control any one of these materials by the plasma heat and chemistry to neutralize the waste materials.

By configuring the bottom and side surfaces of the drum 30 as shown in FIG. 1, and by varying speed of rotation of the drum, the waste material can be spread out over the inclined and vertical walls of the drum. This causes a relatively thin layer 51 of waste materials to be formed which has a large surface area and which can be quickly heated to the desired, very high temperatures. Moreover, the spread out layer 51 can be recirculated and mixed by periodically reducing the rotational speed of the drum to permit materials to flow downwardly from the side walls 40 of the drum.

A further advantage achieved with the reactor of FIG. 1 is that the hot plasma stream 82 is not directed to a stationary area of the drum 30. If it were directed toward such a stationary area, it would tend to overheat that area and limit the temperature with which the plasma torch 72 is operated. Instead, the torch 72 is directed toward rotating member 42 which provides for a better heat distribution and permits portions of the rotor to cool during the time interval when such portions are out of direct contact with the plasma stream 82. As a consequence, it is no longer necessary to feed the waste materials into reactor 10 in liquid form as is required with conventional plasma incinerators. Thus, with reactor 10, liquid as well as solid wastes can be fed directly into the reactor to greatly simplify the handling of various types of waste materials.

A second embodiment of the reactor of the present invention is denoted by the numeral 100 and is shown in FIGS. 2 and 2A. Reactor 100 includes a closed, waterjacketed containment vessel 102 having a rotary drum 104 therewithin. The drum is provided with bearing means (not shown) for mounting the drum in vessel 102 for rotation about a central axis. Vessel 102 has a clean-out port 106, a port 108 for the discharge of products of combustion from the interior space 110 of the vessel, and a port 112 for the feeding of waste materials into region 110 of vessel 102.

The drum includes a conical member 114 which is centrally located with reference to the central axis of the drum. The drum has a flat, generally horizontal bottom surface 116 and a cylindrical vertical wall surface 118 at the outer periphery of surface 116. The upper marginal edge 120 of drum 104 is typically below or only slightly higher than the lower parts of the clean-out port 106 and the discharge port 108 as shown in FIG. 1.

Means for rotating drum 104 about the central axis thereof includes a belt and pulley assembly 122 including a pulley 124 rigid to a spindle 126 which is coupled directly to the drum 104. A timing belt 128 is coupled to pulley 126 and to a pulley 130 rigid to the drive shaft 132 of a variable speed motor 134 below vessel 102. An electrical conductor 136 is coupled to spindle 126 by an appropriate slip ring assembly and is coupled also to electrical ground 138.

A plasma torch 140 is disposed within vessel 102 above member 114 as shown in FIG. 2. Plasma torch 140 includes a torch body 142 pivotally mounted by ball and socket joint 144 on vessel 102. Structure 146 at the upper part of joint 144 has an arm 148 coupled to a fluid piston and cylinder assembly 150 carried by fixed support 152 on vessel 102. When assembly 150 is actuated, torch 140 is pivoted about the axis of joint 144 so as to change the position of the lower end 141 of torch body 142 to get different temperature profiles in drum 104. FIG. 2 shows several locations of the lower end 141 of torch 140.

Torch 140 is coupled by an electrical conductor 150 to an electrical power source 152 to the high voltage side thereof. The low voltage side is coupled to ground potential.

In use, waste materials are directed into vessel 102 through port 112 after drum 104 has been caused to rotate about the central axis thereof. The waste materials are also directed into vessel 102 after an arc has been struck between member 114 and torch 140 to create a plasma stream of high temperature, such as in the range of 10,000° to 15,000° Centigrade.

The waste materials directed into vessel 102 will fall into drum 104 and the rotation of the drum will cause a centrifugal action on such materials, forcing the materials against the inner surface 110 of the side wall of the drum 104. By varying the speed of rotation of the drum, the waste materials in drum 104 can be allowed to gravitate onto surface 116 to spread the waste materials out so that the waste can be more quickly heated to the desired temperatures. Moreover, the spreading out of the waste material causes them to be mixed to permit a more efficient incineration or melting operation in the drum. The effluent from the process of combustion and incineration in drum 104 will pass out of vessel 102 through port 108.

Figure 3B:
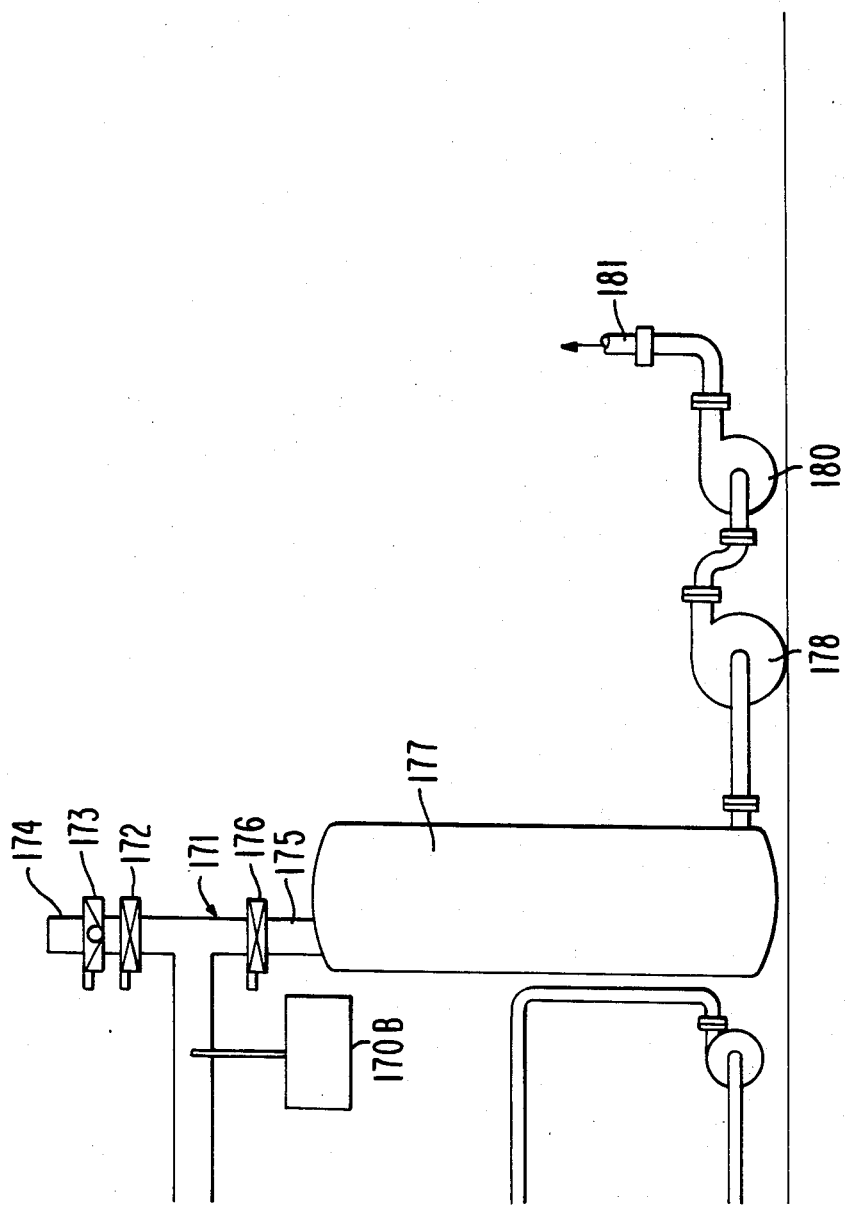
FIG. 3B is a continuation of the system of FIG. 3A.

FIGS. 3A and 3B are views showing a system using the reactor 10 or the reactor 100 in combination with other components adapted for handling hazardous waste materials. As shown in FIG. 3A, reactor 10, for instance, is located on a surface 112 in any suitable manner and has its materials inlet coupled by pipe 22 to the outlet end of a plunger valve 160 whose inlet end is coupled to a screw feeder 161. A thrasher 162 is coupled to the inlet of screw feeder 161 and a storage drum 163 for waste materials to be directed into reactor 10 is coupled to a container lock 164 which in turn is coupled to a drum tipple 165. Thus, waste materials from drum 163 can be directed through lock 164, into thrasher 162, then into and through screw feeder 161, past plunger valve 160 and into the reactor through pipe 22.

The waste materials are incinerated and melted by means of torch 72 which typically is a plasma torch of suitable power for a given reactor through put. The outlet pipe 23 for products of combustion in reactor 10 are directed to a cyclone solids separator 166 having a gas delivery pipe 167 coupled to the inlet of a gas scrubber 168. The pipe 167 first passes through an afterburner 169 provided with an appropriately sized non-transferred plasma torch. The afterburner can be located either before or after the solids separator 166, but it is shown after the separator in FIG. 3A.

The gas fraction from gas scrubber 168 is directed to the inlet of a filter dryer 169 which, in turn, is coupled by a tube or pipe 170a to a tee 171 having a safe vent valve 172 and a vent and flare valve 173 coupled to one branch 174 leading to the atmosphere where flaring of safe combustible gases would also take place. Another branch 175 of tee 171 is coupled by way of a recycle valve 176 to a recycle tank 177 which, through blower 178 and 180, directs the recycle material by way of pipe 181 to the interior of reactor 10 as shown in FIG. 3A. Gas anaylysis system 170b determines if gas is safe for venting or should be recycled as above described by modulating values 172, 173 and 176.

Using the system of FIGS. 3A and 3B, it is possible to receive hazardous waste materials and direct them through the reactor 10 or 100 and then into clean-up components, whereupon the hazardous character of such materials is reduced or substantially eliminated.

Figure 4:
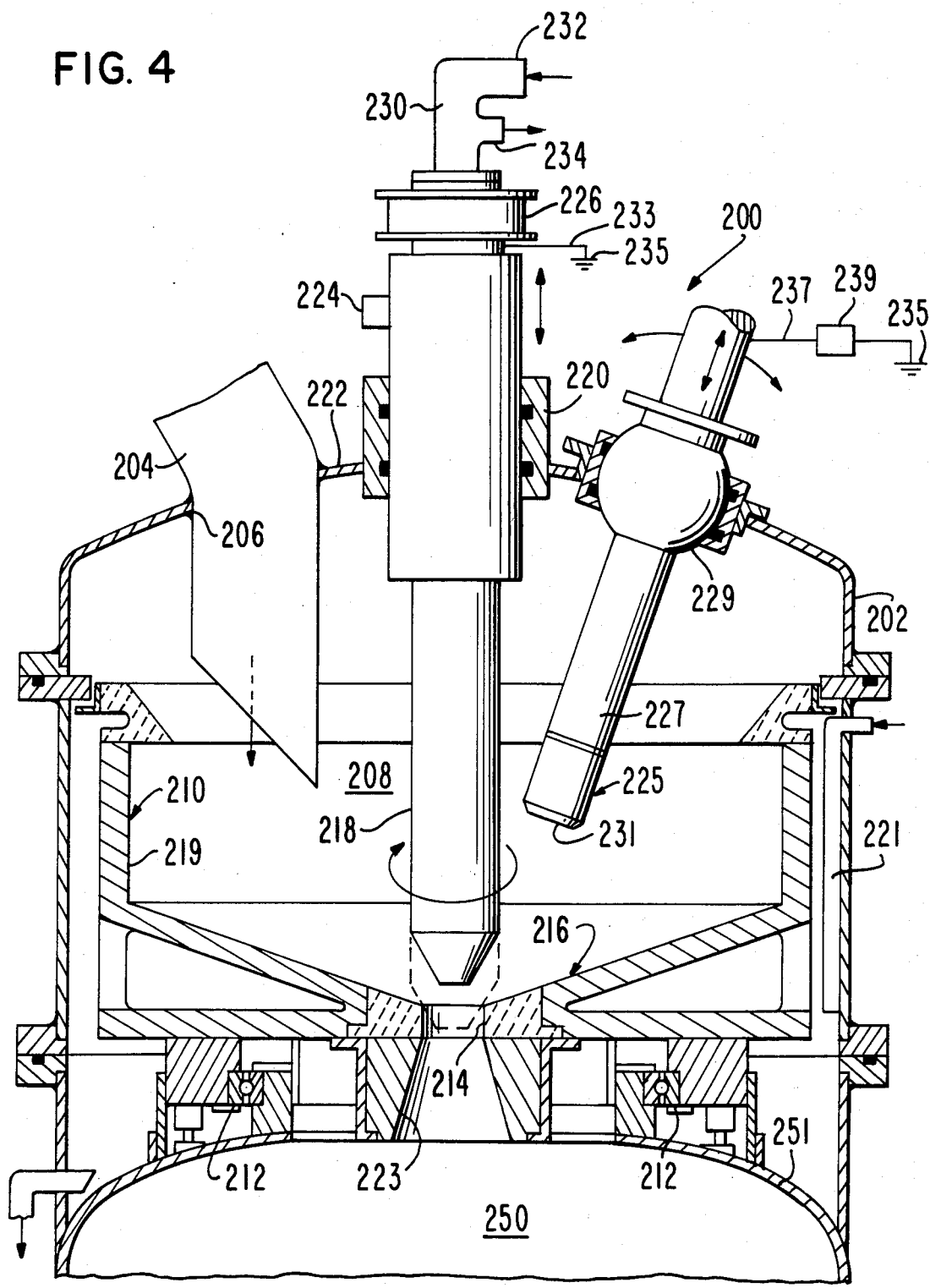
FIG. 4 is a view similar to FIG. 1 but showing another embodiment of the reactor of the present invention.

A third embodiment of the reactor of the present invention is denoted by the numeral 200 and is illustrated in FIG. 4. Reactor 200 includes a closed containment vessel 202 having a pipe 204 extending through an opening 206 therethrough for directing waste materials into the interior space 208 of the vessel 202. A rotary drum 210 is rotatably mounted by bearings 212 therebelow for rotation within vessel 202 about a generally vertical axis. The drum has a central hole 214 in the bottom 216 thereof. The hole is at the lowest part of bottom 216 and is vertically aligned with a water-cooled, rotary electrode 218 mounted for vertical reciprocation by a bearing 220 secured in any suitable manner to the top 222 of vessel 202.

Any suitable drive means 224 is coupled with the upper part of electrode 218 for moving it vertically in opposed directions. Moreover, bearing means 220 allows the electrode to rotate in one direction about its central axis. To this end, a belt and pulley assembly 226 is coupled to the upper end of electrode 218 and is coupled also to a drive motor (not shown) for actuating the rotation of electrode 218. A rotary water joint 230 is also coupled to the interior of electrode 218 for directing cooling water into the interior of the electrode. The water inlet port 232 and a water outlet port 234 is provided with joint 230.

Bottom 216 is inclined upwardly and away from hole 214. Drum 210 also has a vertical, cylindrical side wall 219 at the outer periphery of bottom 216. The side wall 219 extends upwardly and the lower end of pipe 204 extends partially into the open top of the drum. Water can be sprayed from a pipe 221 onto the outer surface of the drum as it rotates for cooling the drum.

The drum has a spindle 223 which is coupled in any suitable manner to a rotating means (not shown), such as a belt and pulley assembly and a variable drive motor. The speed of rotation of the drive motor can be varied to permit the waste materials to move upwardly and downwardly along bottom surface 216 and side wall surface 219 as desired.

Figure 5:
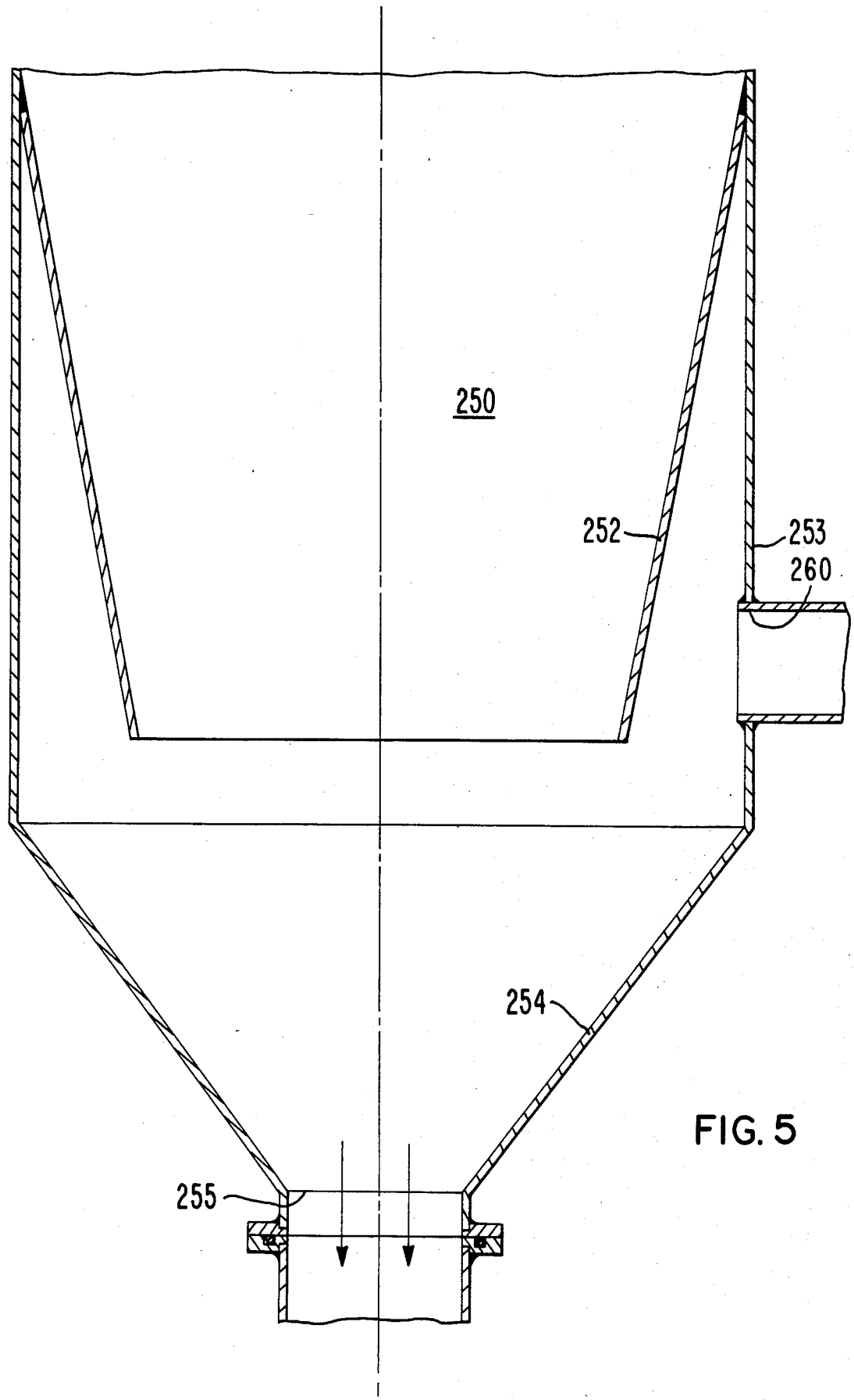
FIG. 5 is a vertical section through the effluent receiver coupled with the bottom part of the reactor of FIG. 4.

FIG. 5 shows a possible means for separating the solid fraction of the waste materials gravitating through hole 214 from the gaseous fraction. To this end, the separating means includes a chamber 250 (FIGS. 4 and 5) formed by a top wall 251, a frusto-conical inner side wall 252 (FIG. 5) a cylindrical outer side wall 253 and a conical bottom wall 254. Outer side wall 253 has an outlet 260 for the gaseous fraction and bottom wall 254 has a small opening 255 leading to a solids handling lock (not shown). Solids and gases will move through chamber 250 from hole 214 and the solids will continue downwardly through opening 255 while the gases will rise and pass laterally through outlet 260.

A ball and socket joint 229 rotatably couples body 227 of plasma torch 225 on the upper wall of 222 of vessel 202. Thus, the lower end 231 of plasma torch 225 can be pivoted with reference to the lower end of electrode 218. Moreover, the electrode has a conductor 233 coupled with the upper end thereof and also coupled to electrical ground 235. A conductor 237 is coupled to the high voltage side of voltage source 239 whose low voltage side is coupled to electrical ground 235. Thus, an electrical field will be established between the electrode 218 the lower end 231 so that an arc can be initiated and maintained between these two components.

The plasma of torch 225 is of the transferred arc type so that a plasma stream will be generated when the arc is struck and this plasma stream will be at very high temperatures, such as in the range of 10,000°–15,000° Centigrade. The heat from the plasma stream will incinerate, cause pyrolysis, react with or melt the materials in drum 210 as the drum is rotated relative to vessel 202. As the drum is rotated, electrode 218 can be rotated and lowered into the dashed line position closing hole 214 so long as the electrode is rotating at the same speed as drum 210. The electrode can be raised to open the hole 214 as deemed necessary to allow the exit of products of combustion.

In use, hazardous waste materials are directed into drum 210 by way of pipe 204. This inflow of waste materials occurs after drum 210 has been rotated and as electrode 218 has been rotated. The electrode typically will plug the hole 214 so that the waste material cannot gravitate through the hole until the waste materials have been incinerated, reduced or melted. A plasma arc will have been struck between electrode 218 and torch 225, causing a plasma stream to be used as the heat source for treating the waste materials. The torch can be pivoted in any suitable manner about the axis of ball joint 225 to orient the plasma stream therefrom.

The rotatable electrode 218 has a two-fold purposes, namely providing the termination for a transferred arc plasma torch 225, especially when non-conducting materials are being melted or incinerated in the drum 210. This rotating electrode 218 also serves to close or restrict the opening 214. Waste materials fed into the reactor 200 is forced against the inner surface of wall 219 of drum 210 while the drum is rotating at a speed sufficient to move the feed by centrifugal force.

To allow the materials to flow out of the drum through the central hole 214, the speed of rotation of the drum is regulated to enable the angle of repose of the waste materials, whether solid or liquid, to flow along inclined bottom 216 and into hole 214 when the hole is open. To this end, the rotating electrode 218 controls the flow of materials through hole 214 as required to insure that all materials are subjected to maximum heat from torch 225. Since melting or incineration is taking place in a closed chamber and since reactor 200 would be sealed so that the only exit of the only hot effluent gases of the plasma torch and incineration process would be through opening 214, maximum efficiency is realized from the input heat. As a result, in many instances, the requirement for a secondary burner would not be necessary due to the high concentration of heat at the effluent opening 214. Due to the cooling of gases downstream of the hole 214 a natural suction or draft would be expected; however, additonal suction could be supplied by downstream pumping if desired.

The shape of drum 210 and the type of materials used to construct reactor 200 could be such as to accommodate a variety of applications, whether it be melting of metals or the incineration of toxic wastes. Cooling of reactor 200 could be accomplished by water spray, water jacketing or gas cooling applied to the outer surfaces of drum 210 as required.

Rotation of drum 210 can be accomplished with a rubber wheel friction drive on the outer surface of the drum, a gear drive, timing belt drive or other means whereby speed regulation could be provided as required. Bearings to support the drum 210 would be protected to prevent damage by water or other cooling media if required. The vessel 202 would normally be cooled as the process continues.

As described above, gravity and the required flow of gas operate to assist in material incineration, pyrolysis, and melting and to obtain maximum heat efficiency from the plasma torch 225. This arrangement of the components is ideal for a continuous reactor operation incorporating an automated process.

The reactor 200 would allow for the handling of a wide variety of liquid, solid and gaseous wastes. The reactor could also be adapted for melting a variety of high performance metals where it is necessary to provide a system to enable the elimination of high density and high density inclusions due to the centrifugal control of material movement in either the solid or liquid state.

I claim:
1. A reactor for incineration, pyrolysis, and melting of waste materials comprising:
 a closed, hollow vessel having wall means surrounding an internal space therewithin, said wall means having a first opening for receiving waste materials to be incinerated and melted and a second opening for allowing products of combustion to exit from the space;
 a drum within said vessel said drum having an inner surface and having a third opening for receiving the waste materials fed into the vessel through said first opening;
 means mounting the drum on said vessel for rotation relative to the vessel;
 means coupled to the drum for rotating the drum relative to the vessel at a speed sufficient to cause the materials in the drum to be directed against the inner surface of the drum by centrifugal force; and a plasma torch carried by the vessel and extending into the space for directing a high temperature plasma into heat exchange relationship with the waste materials in the drum for controlled burning or pyrolysis of the waste materials so that they will be transformed into safe products for disposal.

2. A reactor as set forth in claim 1, wherein the torch is a transferred arc torch with the torch body being at one electrical potential and a portion of the drum being at a second electrical potential, said plasma being directed at said drum portion.

3. A reactor as set forth in claim 2, wherein said drum portion comprises a conical member projecting upwardly from the bottom of the drum.

4. A reactor as set forth in claim 3, wherein the conical member is centrally located with respect to the central axis of the drum, said plasma torch body being laterally offset from said axis.

5. A reactor as set forth in claim 1, wherein the drum has a bottom provided with a spindle thereon, said spindle extending through the wall means, there being a seal at the junction between the spindle and the wall means, whereby the drum can rotate about the central axis of the spindle while the space is isolated from the atmosphere.

6. A reactor as set forth in claim 5, wherein said rotating means includes a variable speed drive motor, and means coupling the drive motor to the spindle.

7. A reactor as set forth in claim 1, wherein the drum has a bottom and a side wall coupled with the bottom at the outer periphery thereof.

8. A reactor as set forth in claim 7, wherein the bottom has an inclined upper surface and the side wall has a generally vertical inner surface.

9. A reactor as set forth in claim 7, wherein the bottom has a generally horizontal upper surface and the side wall has a generally vertical inner surface.

10. A reactor as set forth in claim 1, wherein is included means mounting the torch on said wall means for pivotal movement about an axis perpendicular to the longitudinal axis of the torch, whereby the angle of the plasma emitted by the torch can be varied.

11. A reactor as set forth in claim 1, wherein the drum has a bottom provided with a projection extending upwardly from the bottom, said torch having the plasma stream thereof directed toward said upright portion of the drum, said torch being a transferred arc torch in which the torch body is at one electrical potential and said projection of the drum being at another electrical potential.

12. A reactor as set forth in claim 11, wherein the projection is conical.

13. A reactor as set forth in claim 1, wherein the bottom has a hole therethrough defining said second opening, there being means for selectively plugging the hole.

14. A reactor as set forth in claim 10, wherein said plug means includes an elongated electrode movable vertically toward and away from the hole, and means for moving the electrode relative to the wall means of the vessel.

15. A reactor as set forth in claim 13, wherein said plugging means includes an elongated electrode, means coupled with the electrode for mounting the same rotation about its longitudinal axis, and means for rotating the electrode.

16. A reactor as set forth in claim 15, wherein is includes means mounting the electrode for movement along longitudal axis, and means for moving the electrode.

17. A reactor as set forth in claim 13, wherein said plasma torch extends into the space and terminates adjacent to and spaced from the plug means, the plasma torch being of the transferred arc type.

18. A reactor as set forth in claim 17, wherein is provided means for establishing an electric field between the inner end of the plasma torch and said plug means.

19. A reactor as set forth in claim 1, wherein is included means mounting the plasma torch for pivotal movement on said wall means.

20. A reactor as set forth in claim 19, wherein said mounting means includes a ball and socket joint, there being a seal coupled with a joint to maintain said space closed.

* * * * *